United States Patent
Nashery et al.

(10) Patent No.: US 10,975,862 B2
(45) Date of Patent: *Apr. 13, 2021

(54) VALVE ADAPTER CONNECTION ASSEMBLY

(71) Applicant: EMERSON PROCESS MANAGEMENT REGULATOR TECHNOLOGIES, INC., McKinney, TX (US)

(72) Inventors: Khashayar A. Nashery, Dallas, TX (US); Roy R. Pelfrey, Sherman, TX (US); Mark A. Michnevitz, Frisco, TX (US); Jake Buford, The Colony, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/112,270

(22) Filed: Aug. 24, 2018

(65) Prior Publication Data
US 2018/0363645 A1  Dec. 20, 2018

Related U.S. Application Data

(63) Continuation of application No. 14/919,342, filed on Oct. 21, 2015, now Pat. No. 10,066,619.
(Continued)

(51) Int. Cl.
F16L 23/00 (2006.01)
F04B 53/16 (2006.01)
(Continued)

(52) U.S. Cl.
CPC .............. *F04B 53/16* (2013.01); *F04B 53/10* (2013.01); *F16K 27/00* (2013.01); *F16L 23/18* (2013.01); *F16L 25/14* (2013.01); *F16L 23/003* (2013.01)

(58) Field of Classification Search
CPC ......... F16L 23/02; F16L 23/12; F16L 23/125; F16L 23/024; F16L 23/0286; F16L 23/18
(Continued)

(56) References Cited

U.S. PATENT DOCUMENTS

| | | | |
|---|---|---|---|
| 516,216 A | 3/1894 | McKim | |
| 4,000,753 A * | 1/1977 | Ellis | F16K 27/00 137/296 |

(Continued)

FOREIGN PATENT DOCUMENTS

| | | |
|---|---|---|
| CN | 205504268 U | 8/2016 |
| DE | 202009018129 U1 | 3/2011 |

(Continued)

OTHER PUBLICATIONS

Office Action issued in Chinese Patent Application No. 201510727207.3, dated Jul. 18, 2018.
(Continued)

*Primary Examiner* — David Bochna
(74) *Attorney, Agent, or Firm* — Marshall, Gerstein & Borun LLP

(57) ABSTRACT

A self-centering valve adapter connection assembly includes a first equipment flange that is connected to a second equipment flange with an adapter ring. The adapter ring includes a first longitudinal flange with a tapered inner surface and a cylindrical outer surface. The adapter ring aids in centering the first and second equipment flanges while smoothing a fluid flow corridor between the first equipment flange and the second equipment flange.

19 Claims, 6 Drawing Sheets

Related U.S. Application Data

(60) Provisional application No. 62/073,771, filed on Oct. 31, 2014.

(51) Int. Cl.
  *F04B 53/10* (2006.01)
  *F16L 25/14* (2006.01)
  *F16K 27/00* (2006.01)
  *F16L 23/18* (2006.01)

(58) Field of Classification Search
  USPC .................................................. 285/55, 368
  See application file for complete search history.

(56) References Cited

U.S. PATENT DOCUMENTS

| | | | |
|---|---|---|---|
| 4,648,631 A | 3/1987 | Bryant | |
| 4,709,933 A | 12/1987 | Adamek et al. | |
| 5,174,615 A | 12/1992 | Foster et al. | |
| 6,561,521 B2 | 5/2003 | Janoff et al. | |
| 7,341,288 B2 * | 3/2008 | Lundstrom | F16L 21/007 285/104 |
| 10,066,619 B2 * | 9/2018 | Nashery | F04B 53/10 |
| 2005/0081380 A1 | 4/2005 | Knoblauch | |

FOREIGN PATENT DOCUMENTS

| | | |
|---|---|---|
| EP | 2639481 A2 | 9/2013 |
| GB | 814287 A | 6/1959 |
| JP | H6147376 A | 5/1994 |
| WO | WO-2014030316 A1 | 2/2014 |

OTHER PUBLICATIONS

Search Report for International application No. PCT/US2015/058188, dated Feb. 4, 2016.
Written Opinion for International application No. PCT/US2015/058188, dated Feb. 4, 2016.
International Preliminary Report on Patentability for International application No. PCT/US2015/058188, dated May 2, 2017.
Office Action for U.S. Appl. No. 14/919,342, dated Jan. 8, 2018.

* cited by examiner

VALVE ADAPTER CONNECTION ASSEMBLY

CROSS-REFERENCE TO RELATED APPLICATIONS

This application is a continuation of U.S. patent application Ser. No. 14/919,342, now U.S. Pat. No. 10,066,619, entitled "Valve Adapter Connection Assembly" and filed Oct. 21, 2015, which claims the benefit of U.S. Provisional Patent Application No. 62/073,771, entitled "Valve Adapter Connection Assembly" and filed Oct. 31, 2014, the entire disclosures of which are hereby incorporated by reference herein.

FIELD OF THE DISCLOSURE

The disclosure generally relates to valve connection assemblies and more specifically to valve connection assemblies that are self-centering and that provide a smooth transition from the valve to another component, such as a pump.

BACKGROUND

Fluid control devices include various categories of equipment including control valves and regulators. Such control devices are adapted to be coupled within a fluid process control system such as chemical treatment systems, natural gas delivery systems, etc., for controlling the flow of a fluid therethrough. Each control device defines a fluid flow-path and includes a control member for adjusting a dimension of the flow-path.

The fluid control devices are often coupled to a fluid process system that includes other elements, such as pumps and pipelines. Generally, both the fluid control device and the other element include external flanges at each end for connection to the fluid process system. The flanges of the elements are bolted, or otherwise fastened, together to connect the elements. Gaskets are often placed between the flanges to prevent fluid leaks.

Current methods of flange and gasket connections have certain disadvantages. For example, the gasket can degrade over time, or become damaged during installation, which may lead to fluid leakage. Additionally, the internal transition from one element to the other is not smooth and steps or indentations may be formed in the fluid flow path by the two mating flanges. These steps or indentations can cause flow disruptions in fluid flowing through the fluid process system. These flow disruptions can case a loss of efficiency or even premature failure of components. Additionally, the flanges may easily be misaligned, which may cause more flow disruption and cavitation within the fluid process system.

DETAILED DESCRIPTION

Figure 1:
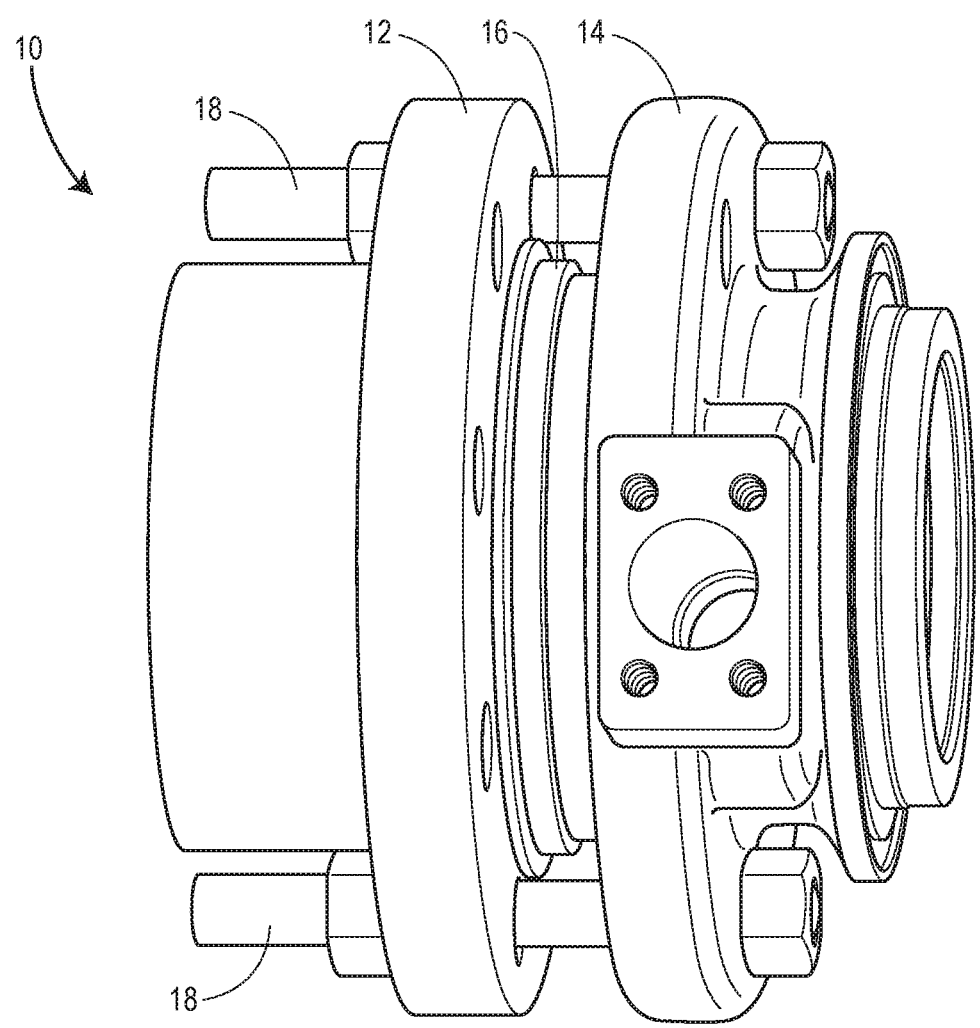
FIG. 1 is a perspective view of a first embodiment of a valve adapter connection assembly constructed in accordance with the disclosure.
Figure 2:
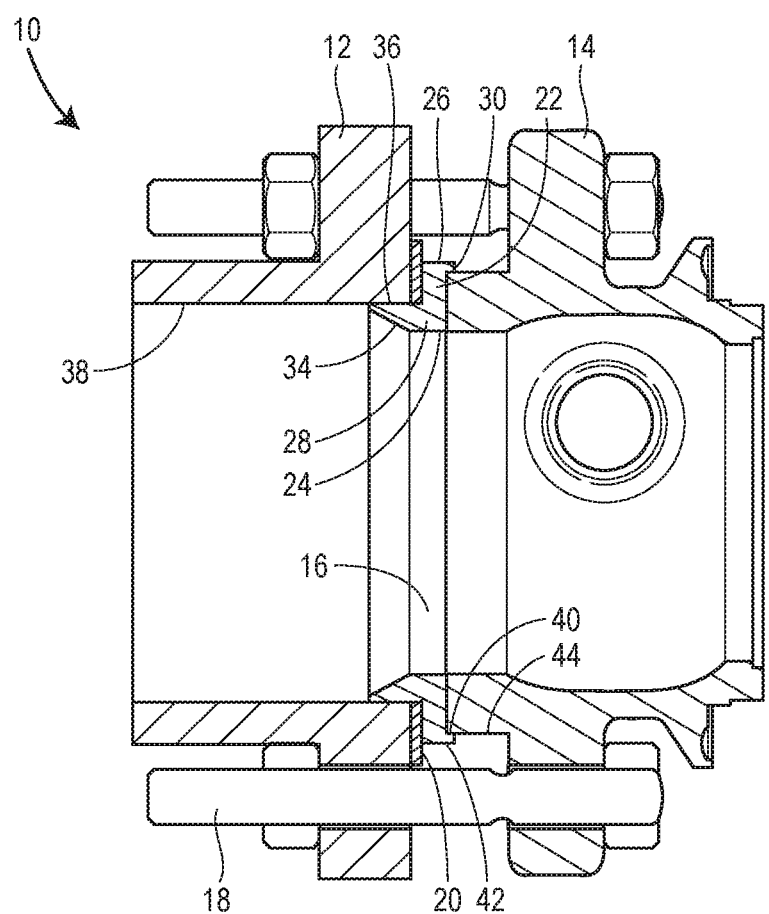
FIG. 2 is a longitudinal cross-sectional view of the valve adapter connection assembly of FIG. 1.

Turning now to FIGS. 1 and 2, a first embodiment of a valve adapter connection assembly 10 is illustrated that is constructed in accordance with the teachings of the disclosure. The valve adapter connection assembly 10 includes a first equipment flange, such as a pump flange 12, and a second equipment flange, such as a valve flange 14. An adapter ring 16 is disposed between the pump flange 12 and the valve flange 14. The pump flange 12 and the valve flange 14 may be secured to one another by a plurality of fasteners, such as bolts 18. A gasket 20 may be disposed between the pump flange 12 and the adapter ring 16. While the first equipment flange is illustrated as a pump flange and the second equipment flange is illustrated as a valve flange, the first and second equipment may comprise virtually any type of equipment found in fluid processing systems, such as pipes, pipelines, sensors, etc.

The adapter ring 16 comprises an annular ring 22 having an inner surface 24 and an outer surface 26. A first longitudinal flange, for example an inner longitudinal flange 28, extends away from the annular ring 22 proximate the inner surface 24, and a second longitudinal flange, for example an external longitudinal flange 30, extends away from the annular ring proximate the outer surface 26. The first longitudinal flange 28 includes an inner, tapered surface 34 and an outer cylindrical surface 36. The outer cylindrical surface 36 is positioned adjacent to an inner cylindrical surface 38 on the pump flange 12. The tapered surface 34 may be tapered at an angle of between 5° and 45° with respect to the outer cylindrical surface 36, preferably between 7° and 40°, and more preferably between 10° and 30°. Tapered surfaces 34 having angles in these ranges produce smooth flow corridor transitions, thereby reducing flow cavitation within the flow corridor.

The second longitudinal flange 30 includes an inner cylindrical surface 40 and an outer cylindrical surface 42. The inner cylindrical surface 40 is positioned adjacent to an outer cylindrical surface 44 of the valve flange 14. The gasket 20 is positioned between the pump flange 12 and the annular ring 22.

In the embodiment of FIGS. 1 and 2, the first longitudinal flange 28 is thicker than the second longitudinal flange 30 and the first longitudinal flange 28 is longer than the second longitudinal flange 30.

The first longitudinal flange 28 and the second longitudinal flange 30 align with the inner cylindrical surface 38 of the pump flange 12 and with the outer cylindrical surface 44 of the valve flange 14, respectively, to correctly orient the pump flange 12 relative to the valve flange 14, which produces a self-centering effect when the pump flange 12 is joined to the valve flange 14.

Figure 3:
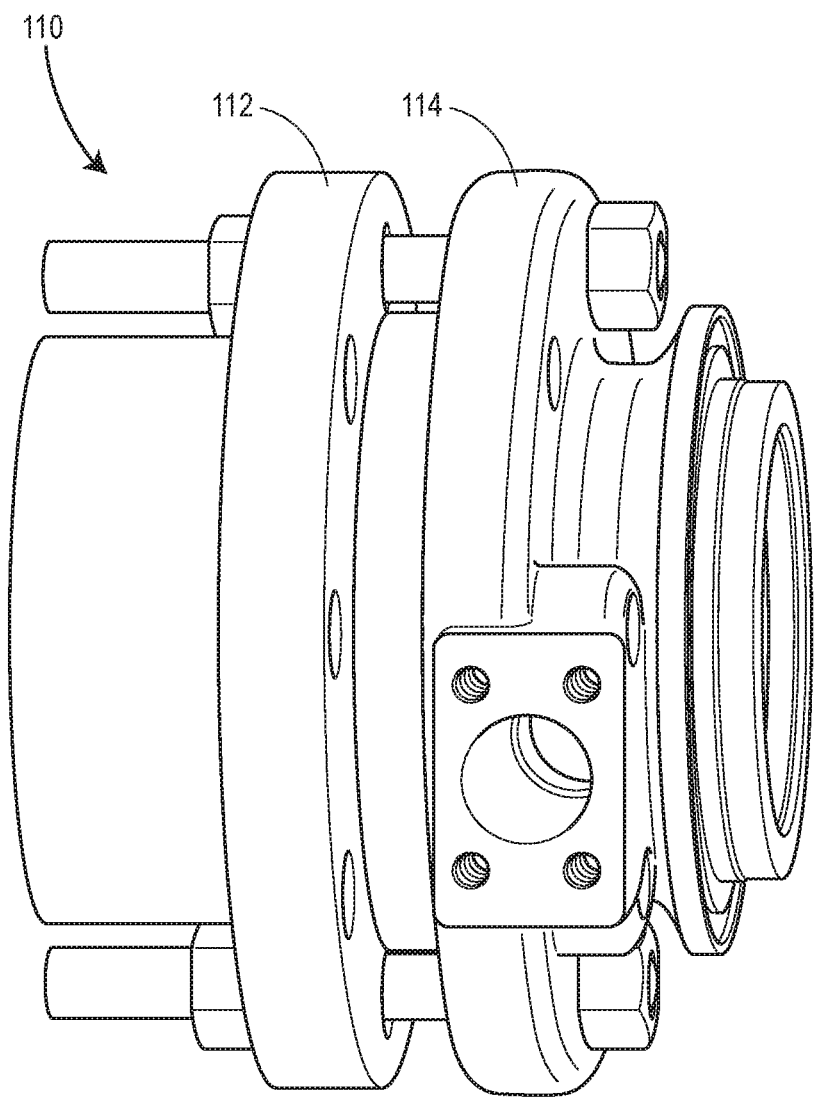
FIG. 3 is a perspective view of a second embodiment of a valve adapter connection assembly constructed in accordance with the disclosure.
Figure 4:
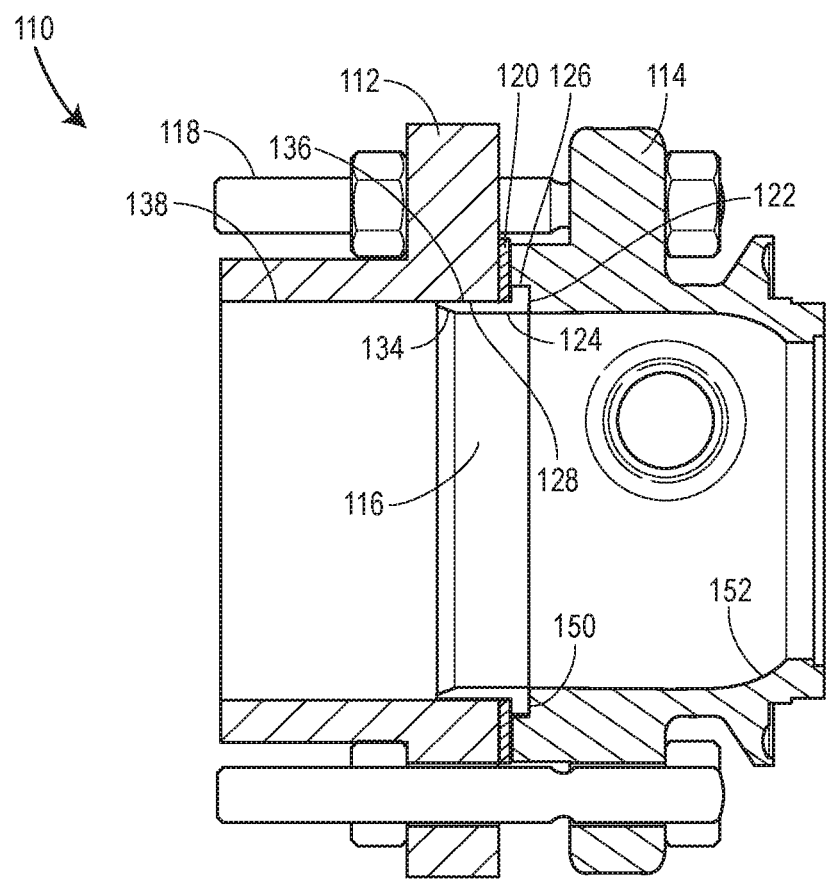
FIG. 4 is a longitudinal cross-sectional view of the valve adapter connection assembly of FIG. 3.

Turning now to FIGS. 3 and 4, a second embodiment of a valve adapter connection assembly 110 is illustrated that is constructed in accordance with the teachings of the disclosure. Elements of the embodiment of FIGS. 3 and 4 are numbered 100 greater than corresponding elements in the embodiment of FIGS. 1 and 2. Similar to the previous embodiment, this valve adapter connection assembly 110 includes a first equipment flange, such as a pump flange 112, and a second equipment flange, such as a valve flange 114.

An adapter ring 116 is disposed between the pump flange 112 and the valve flange 114. The adapter ring 116 differs from the adapter ring 16 of FIGS. 1 and 2 in that the adapter ring 116 in FIGS. 3 and 4 is located completely internally. The pump flange 112 and the valve flange 114 may be secured to one another by a plurality of fasteners, such as bolts 118. A gasket 120 may be partially disposed between the pump flange 112 and the adapter ring 116 and partially between the pump flange 112 and the valve flange 114. While the first equipment flange is illustrated as a pump flange and the second equipment flange is illustrated as a valve flange, the first and second equipment may comprise virtually any type of equipment found in fluid processing systems, such as pipes, pipelines, sensors, etc.

The adapter ring 116 comprises an annular ring 122 having an inner surface 124 and an outer surface 126. A first longitudinal flange, for example an inner longitudinal flange 128, extends away from the annular ring 122 proximate the inner surface 124. The first longitudinal flange 128 includes an inner, tapered surface 134 and an outer cylindrical surface 136. The outer cylindrical surface 136 is positioned adjacent to an inner cylindrical surface 138 on the pump flange 112. The tapered surface 134 may be tapered at an angle of between 5° and 45° with respect to the outer cylindrical surface 36, preferably between 7° and 40° and more preferably between 10° and 30°. Tapered surfaces 134 having angles in these ranges produce smooth flow corridor transitions, thereby reducing flow cavitation within the flow corridor.

The annular ring 122 is seated within an internal shoulder 150 formed in an inner surface 152 of the valve flange 114. The first longitudinal flange 128 and the annular ring 122 align with the inner cylindrical surface 138 of the pump flange 112 and with the internal shoulder 150 of the valve flange 114, respectively, to correctly orient the pump flange 12 relative to the valve flange 14, which produces a self-centering effect when the pump flange 12 is joined to the valve flange 14.

Figure 5:
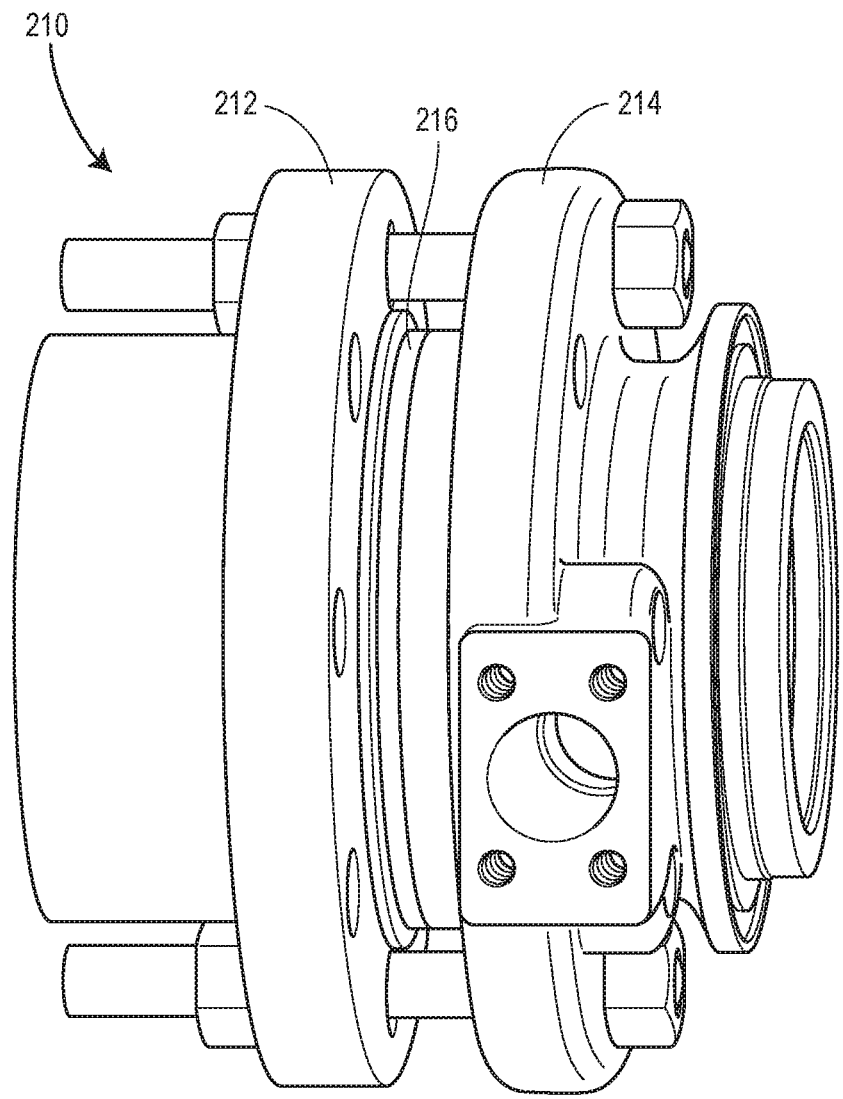
FIG. 5 is a perspective view of a third embodiment of a valve adapter connection assembly constructed in accordance with the disclosure.
Figure 6:
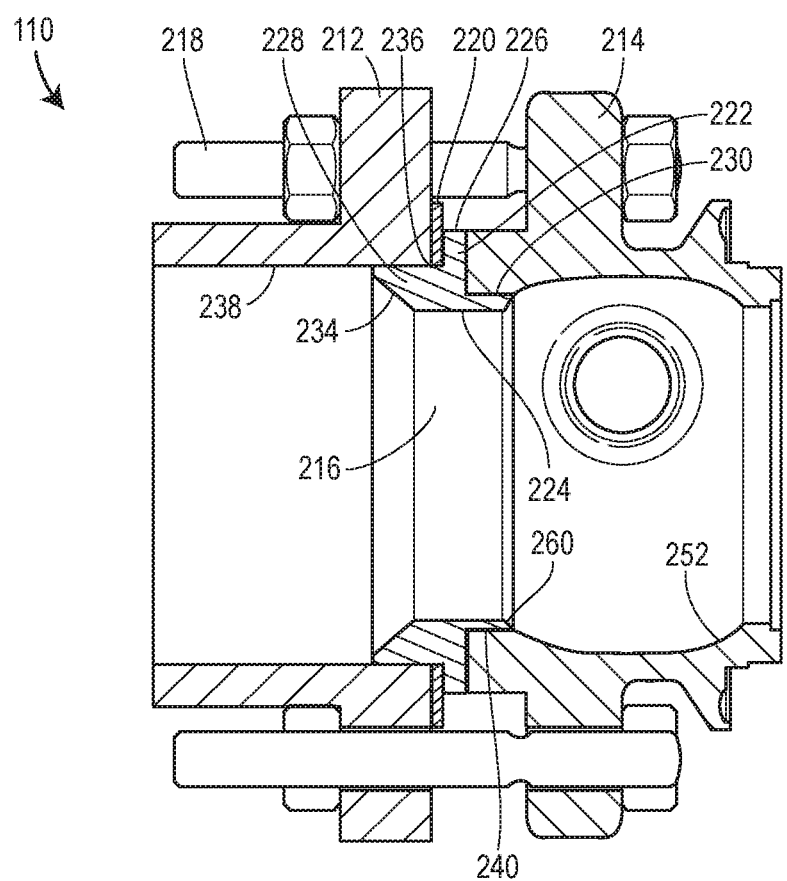
FIG. 6 is a longitudinal cross-sectional view of the valve adapter connection assembly of FIG. 5.

Turning now to FIGS. 5 and 6, a third embodiment of a valve adapter connection assembly 210 is illustrated that is constructed in accordance with the teachings of the disclosure. Elements of the embodiment of FIGS. 5 and 6 are numbered 200 greater than corresponding elements in the embodiment of FIGS. 1 and 2 and 100 greater than corresponding elements of FIGS. 3 and 4. Similar to the previous embodiments, this valve adapter connection assembly 210 includes a first equipment flange, such as a pump flange 212, and a second equipment flange, such as a valve flange 214. An adapter ring 216 is disposed between the pump flange 212 and the valve flange 214. The pump flange 212 and the valve flange 214 may be secured to one another by a plurality of fasteners, such as bolts 218. A gasket 220 may be disposed between the pump flange 212 and the adapter ring 216. While the first equipment flange is illustrated as a pump flange and the second equipment flange is illustrated as a valve flange, the first and second equipment may comprise virtually any type of equipment found in fluid processing systems, such as pipes, pipelines, sensors, etc.

The adapter ring 216 comprises an annular ring 222 having an inner surface 224 and an outer surface 226. A first longitudinal flange, for example a first inner longitudinal flange 228, extends away from the annular ring 222 proximate the inner surface 224, and a second longitudinal flange, for example a second inner longitudinal flange 230, extends away from the annular ring 222 opposite the first inner longitudinal flange 228. The first inner longitudinal flange 228 includes an inner, tapered surface 234 and an outer cylindrical surface 236. The outer cylindrical surface 236 is positioned adjacent to an inner cylindrical surface 238 on the pump flange 212. The tapered surface 234 may be tapered at an angle of between 5° and 45° with respect to the outer cylindrical surface 36 of the adapter 16, preferably between 7° and 40° and more preferably between 10° and 30°. Tapered surfaces 234 having angles in these ranges produce smooth flow corridor transitions, thereby reducing flow cavitation within the flow corridor.

The second longitudinal flange 230 includes an outer cylindrical surface 240 and an inner tapered surface 260. The inner tapered surface 260 may preferably be tapered in the same ranges as the inner tapered surface 234. The outer cylindrical surface 240 is positioned adjacent to a cylindrical surface 252 of the valve flange 214. The gasket 220 is positioned between the pump flange 212 and the annular ring 222.

The first longitudinal flange 228 and the second longitudinal flange 230 align with the inner cylindrical surface 238 of the pump flange 12 and with the inner cylindrical surface 252 of the valve flange 214, respectively, to correctly orient the pump flange 212 relative to the valve flange 214, which produces a self-centering effect when the pump flange 212 is joined to the valve flange 214.

The valve adapter connection assemblies disclosed herein advantageously allow valves to be optimally mated to pumps or other system equipment. The disclosed valve adapter connection assemblies provide self-centering during mating and they also smooth the interior flow path by eliminating abrupt step changes in the flow path, which reduces turbulent flow and increases pump life. Additionally, the disclosed valve adapter connection assemblies protect and center a gasket, thereby extending the useful life of the gasket and preventing premature leaks.

In some embodiments, the adapter rings disclosed herein may include surface finishes that reduce turbulent flow of fluids through the flow corridor. In other embodiments, the adapter ring may include a flexible rubber flow surface. In some embodiments, the flexible rubber flow surface may be moldable/movable to change flow properties of fluid flowing through the flow corridor. In yet other embodiments, the flexible rubber flow surface may be moldable/movable with changes in air pressures or temperatures.

Any features of a single embodiment may be combined with any other illustrated embodiments unless expressly stated otherwise in the disclosure.

In light of the foregoing, the description of the present disclosure should be understood as merely providing examples of the present invention and, thus, variations that do not depart from the gist of the invention are intended to be within the scope of the invention.

The invention claimed is:

1. A valve adapter connection assembly comprising:
   an adapter ring, the adapter ring including an annular ring having an inner surface and an outer surface, a first longitudinal flange extending away from the annular ring proximate the inner surface, and a second longitudinal flange extending away from the annular ring proximate the outer surface, the first longitudinal flange and the second longitudinal flange extending in opposite directions; and
   a gasket that is configured to be disposed adjacent the annular ring,
   wherein the first longitudinal flange includes an inner tapered surface and an outer cylindrical surface, wherein the gasket is configured to be seated against the outer cylindrical surface of the first longitudinal flange, and wherein the first longitudinal flange is longer than the second longitudinal flange.

2. The valve adapter connection assembly of claim 1, wherein the inner tapered surface is tapered in the range of 5° to 45.

3. The valve adapter connection assembly of claim 1, wherein the first longitudinal flange is thicker that the second longitudinal flange.

4. The valve adapter connection assembly of claim 1, wherein the adapter ring is coated with a surface finish that reduces turbulent fluid flow.

5. The valve adapter connection assembly of claim 1, wherein the outer cylindrical surface of the first longitudinal flange is adapted to be disposed adjacent to an inner cylindrical surface of an equipment flange.

6. An external internal self-centering valve comprising: the valve adapter connection assembly of claim 1.

7. The valve adapter connection assembly of claim 1, wherein the gasket is configured to be disposed radially outward of the inner tapered surface.

8. A self-centering valve comprising:
a valve adapter connection assembly comprising:
an adapter ring, the adapter ring including an annular ring having an inner surface and an outer surface, and a first longitudinal flange extending away from the annular ring proximate the inner surface; and
a gasket that is configured to be disposed adjacent the annular ring at least partially between a first equipment flange and a second equipment flange,
wherein the first longitudinal flange includes an inner tapered surface and an outer cylindrical surface,
wherein the annular ring further has a first surface extending between the inner surface and the outer surface and a second surface extending between the inner surface and the outer surface opposite the first surface, and wherein the first surface is adapted to engage a portion of the second equipment flange and the gasket is configured to be disposed against the second surface, and
wherein the first longitudinal flange is adapted to directly engage an internal surface of the first equipment flange.

9. The self-centering valve of claim 8, wherein the inner tapered surface is tapered in the range of 5° to 45°.

10. The self-centering valve of claim 8, wherein the adapter ring is coated with a surface finish that reduces turbulent fluid flow.

11. The self-centering valve of claim 8, wherein the outer cylindrical surface of the first longitudinal flange is adapted to directly engage the internal surface of the first equipment flange.

12. A valve adapter connection assembly comprising:
an adapter ring, the adapter ring including an annular ring having an inner surface and an outer surface, a first longitudinal flange extending away from the annular ring proximate the inner surface and terminating at a first end, and a second longitudinal flange extending away from the annular ring proximate the inner surface or the outer surface and terminating at a second end, the first longitudinal flange and the second longitudinal flange extending in opposite directions, wherein the adapter ring is adapted to sealingly engage a first equipment flange and a second equipment flange at axial positions between the first end of the first longitudinal flange and the second end of the second longitudinal flange, wherein the first longitudinal flange includes an inner tapered surface and an outer cylindrical surface and the second longitudinal flange includes an inner tapered surface and an outer cylindrical surface, and wherein the outer cylindrical surface of the first longitudinal flange is adapted to directly engage the first equipment flange; and a gasket configured to be seated against the outer cylindrical surface of the first longitudinal flange, wherein the gasket extends radially outwardly of the second longitudinal flange.

13. The valve adapter connection assembly of claim 12, wherein the inner tapered surface of the first longitudinal flange is tapered in the range of 5° to 45, and/or wherein the inner tapered surface of the second longitudinal flange is tapered in the range of 5° to 45°.

14. The valve adapter connection assembly of claim 12, wherein the first longitudinal flange is longer than the second longitudinal flange.

15. The valve adapter connection assembly of claim 12, wherein the first longitudinal flange is thicker that the second longitudinal flange.

16. The valve adapter connection assembly of claim 12, wherein the adapter ring is coated with a surface finish that reduces turbulent fluid flow.

17. The valve adapter connection assembly of claim 12, wherein the outer cylindrical surface of the first longitudinal flange is adapted to directly engage an inner cylindrical surface of the first equipment flange.

18. The valve adapter connection assembly of claim 12, wherein the second longitudinal flange is adapted to directly engage the second equipment flange.

19. An external internal self-centering valve comprising:
a valve adapter connection assembly comprising:
an adapter ring, the adapter ring including an annular ring having an inner surface and an outer surface, a first longitudinal flange extending away from the annular ring proximate the inner surface and terminating at a first end, and a second longitudinal flange extending away from the annular ring proximate the inner surface or the outer surface and terminating at a second end, the first longitudinal flange and the second longitudinal flange extending in opposite directions,
wherein the adapter ring is adapted to sealingly engage a first equipment flange and a second equipment flange at axial positions between the first end of the first longitudinal flange and the second end of the second longitudinal flange,
wherein the first longitudinal flange includes an inner tapered surface and an outer cylindrical surface and the second longitudinal flange includes an inner tapered surface and an outer cylindrical surface, and
wherein the outer cylindrical surface of the first longitudinal flange is adapted to directly engage the first equipment flange.

* * * * *

UNITED STATES PATENT AND TRADEMARK OFFICE
CERTIFICATE OF CORRECTION

PATENT NO. : 10,975,862 B2
APPLICATION NO. : 16/112270
DATED : April 13, 2021
INVENTOR(S) : Khashayar A. Nashery et al.

Page 1 of 1

It is certified that error appears in the above-identified patent and that said Letters Patent is hereby corrected as shown below:

In the Specification

At Column 1, Line 50, "case" should be -- cause --.

In the Claims

At Column 5, Line 10, "thicker that the" should be -- thicker than the --.

At Column 6, Line 27, "thicker that the" should be -- thicker than the --.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*